United States Patent
Xu et al.

(10) Patent No.: US 9,118,239 B2
(45) Date of Patent: Aug. 25, 2015

(54) POWER SUPPLY CONTROL METHOD FOR CONSTANT CURRENT CONSTANT POWER CONTROL

(71) Applicant: Texas Instruments Incorporated, Dallas, TX (US)

(72) Inventors: Shanguang Xu, Plano, TX (US); Zhong Ye, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 335 days.

(21) Appl. No.: 13/835,427

(22) Filed: Mar. 15, 2013

(65) Prior Publication Data

US 2013/0258731 A1    Oct. 3, 2013

Related U.S. Application Data

(60) Provisional application No. 61/617,441, filed on Mar. 29, 2012.

(51) Int. Cl.
*H02M 1/08* (2006.01)
*H02M 3/157* (2006.01)
*H02M 3/156* (2006.01)

(52) U.S. Cl.
CPC ............... *H02M 1/08* (2013.01); *H02M 3/156* (2013.01); *H02M 3/157* (2013.01)

(58) Field of Classification Search
CPC .............................. H02M 3/156; H02M 3/157
USPC ........................... 323/282, 283, 284, 285, 318
See application file for complete search history.

(56) References Cited

U.S. PATENT DOCUMENTS

| | | | |
|---|---|---|---|
| 4,661,898 A | 4/1987 | Hase | |
| 8,674,674 B1* | 3/2014 | Abu Qahouq | 323/283 |
| 2005/0036245 A1 | 2/2005 | Greenfeld | |
| 2005/0111242 A1 | 5/2005 | Oh | |
| 2005/0206358 A1* | 9/2005 | Van Der Horn et al. | 323/282 |
| 2006/0267514 A1* | 11/2006 | Xu | 315/291 |
| 2008/0067993 A1* | 3/2008 | Coleman | 323/282 |
| 2008/0164859 A1* | 7/2008 | Peng et al. | 323/318 |
| 2008/0298092 A1 | 12/2008 | Sugahara | |
| 2009/0310385 A1 | 12/2009 | Maksimovic et al. | |
| 2010/0091524 A1 | 4/2010 | Chen et al. | |
| 2010/0277139 A1 | 11/2010 | Huang et al. | |
| 2010/0308733 A1 | 12/2010 | Shao | |
| 2012/0274290 A1 | 11/2012 | Ye et al. | |

OTHER PUBLICATIONS

PCT Search Report mailed Jul. 5, 2013.
Texas Instruments' Data Manual titled "UCD3138 Highly Integrated Digital Controller for Isolated Power", Literature No. SLUSAP2B, Mar. 2012—Revised Jul. 2012.

* cited by examiner

*Primary Examiner* — Jessica Han
*Assistant Examiner* — Trinh Dang
(74) *Attorney, Agent, or Firm* — William B. Kempler; Frank D. Cimino

(57) ABSTRACT

A digital power supply and power supply controller are presented, including a voltage control loop and a current control loop, with a controller for pulse width modulating a switching power supply according to a voltage control loop duty cycle output or a current control loop duty cycle output, in which the controller selectively presets the voltage control loop duty cycle output to a predetermined value before switching from current loop control to voltage loop control and/or inhibits increase in a voltage loop integrator value during current loop control to mitigate voltage overshoot.

20 Claims, 4 Drawing Sheets

POWER SUPPLY CONTROL METHOD FOR CONSTANT CURRENT CONSTANT POWER CONTROL

REFERENCE TO RELATED APPLICATION

This application claims priority to and the benefit of U.S. Provisional Patent Application Ser. No. 61/617,441 that was filed on Mar. 29, 2012 and is entitled CONSTANT CURRENT CONSTANT POWER CONTROL FOR POWER CONVERTER, the entirety of which is incorporated by reference herein.

FIELD OF THE INVENTION

The present disclosure relates to power conversion circuitry, and more particularly to selective pulse width modulation (PWM) control of switching power supplies using a duty cycle from a voltage control loop or a current control loop.

BACKGROUND

Switching power supplies or switching power converters are used in a variety of applications to convert power from an input source to drive a load. Control of the conversion is provided by pulse width modulation of power supply switches, for example, by varying a switch on time or duty cycle, with the converter operating at a given switching frequency. Switching power supplies may be operated using constant current (CC) control techniques for improved reliability to allow the power supply to continue provision of output current beyond a nominal value, and constant voltage (CV) operation is used at lower power levels, with some power supplies employing constant power (CP) operation. Constant voltage operation is sometimes achieved using a voltage loop to regulate the output voltage and constant current operation is sometimes achieved using a current loop to regulate the output current. The voltage loop is often used for constant power operation with a power supply controller operating the voltage loop with a voltage reference set to the maximum power value divided by the output current. The use of constant current operation may allow the power supply to avoid overcurrent protection shutdown in certain situations. This is advantageous, for example, when using multiple power supplies in a redundant system. Without constant current control capabilities, a given power supply could assume too much load current for some reason and hit overcurrent protection (OCP) levels to trigger a shutdown. This, in turn, may lead to another power supply assuming the current load, reaching OCP levels, and ultimately shutting down. Thus, constant current control using a voltage loop to regulate output voltage and a current loop to regulate output current is an important feature in certain applications, such as portable telecommunications devices, battery chargers, server applications, etc. However, these power supply control techniques suffer from potential voltage overshoot when control is switched from the current loop to the voltage loop. For instance, when a large load current is demanded during operation according to the current loop, the voltage loop may call for a large duty cycle when the output voltage is low relative to a voltage reference. Switching control back to the voltage loop may result in pulse width modulation according to a large duty cycle in excess of that needed to obtain the desired voltage, leading to a voltage spike or overshoot condition which can damage downstream equipment and/or cause the power supply to be shut down. Accordingly, improved power supply control techniques and apparatus are needed to mitigate or avoid voltage overshoot in switching from current loop control to voltage loop control.

SUMMARY

The present disclosure provides apparatus and methods for controlling a switching power supply, in which pulse width modulation control is selectively switched between voltage loop control and current loop control to facilitate constant voltage, constant power, and constant current operation, while selectively controlling switch over from current loop control to voltage loop control to avoid or mitigate voltage spikes.

A switching power supply and a power supply controller are provided in accordance with certain aspects of the present disclosure, including a voltage controller or voltage control circuit as well as a current control circuit, each providing corresponding duty cycle signals or values, along with a pulse width modulation circuit that operates one or more switches of a switching power supply according to a duty cycle input. A control circuit operates in a first mode to provide the duty cycle input as the voltage control duty cycle, and in a second mode provides the current control duty cycle as the duty cycle input. In addition, the control circuit switches between the first and second modes according to the relative voltage and current control duty cycles and selectively presets the voltage control duty cycle to a predetermined value prior to switching from current control to voltage control. The control circuit may also freeze or limit increases in integrator values of a voltage loop compensator during current loop control. These techniques may be advantageously employed to mitigate or avoid voltage spikes upon transition from current loop operation to voltage loop operation. In certain embodiments, the voltage control duty cycle need not be preset to the predetermined value in situations where the computed voltage control duty cycle is less than the predetermined value prior to transitioning to voltage loop control operation. The predetermined preset value for the voltage loop in certain embodiments is close to a current command value at light load for peak current mode control or close to the duty command value at light load for voltage mode control. In addition, certain embodiments of the power supply controller may include a comparator circuit for operation according to the current loop, which provides the duty cycle input to the PWM circuit based on comparison of the voltage loop duty cycle with a switching current of the power supply.

Methods are provided for pulse width modulation of a switching power supply, including comparing a voltage loop duty cycle to a current loop duty cycle, and pulse width modulating the power supply switch or switches according to the current loop duty cycle if the voltage loop duty cycle plus a predetermined hysteresis value exceeds the current loop duty cycle. In addition, if the voltage loop duty cycle is less than the current loop duty cycle, the method involves selectively presetting the voltage loop duty cycle to a predetermined value, and then pulse width modulating the power supply switch or switches according to the voltage loop duty cycle. In certain implementations, the method also includes preventing increase of an integrator value used in computing the voltage loop duty cycle while pulse width modulating the switch according to the current loop duty cycle. In certain embodiments, moreover, the method may include selectively refraining from presetting the voltage loop duty cycle if the voltage control duty cycle is less than the predetermined value.

DESCRIPTION OF THE DRAWINGS

The following description and drawings set forth certain illustrative implementations of the disclosure in detail, which are indicative of several exemplary ways in which the various principles of the disclosure may be carried out. The illustrated examples, however, are not exhaustive of the many possible embodiments of the disclosure. Other objects, advantages and novel features of the disclosure will be set forth in the following detailed description when considered in conjunction with the drawings, in which.

DETAILED DESCRIPTION

Figure 1:
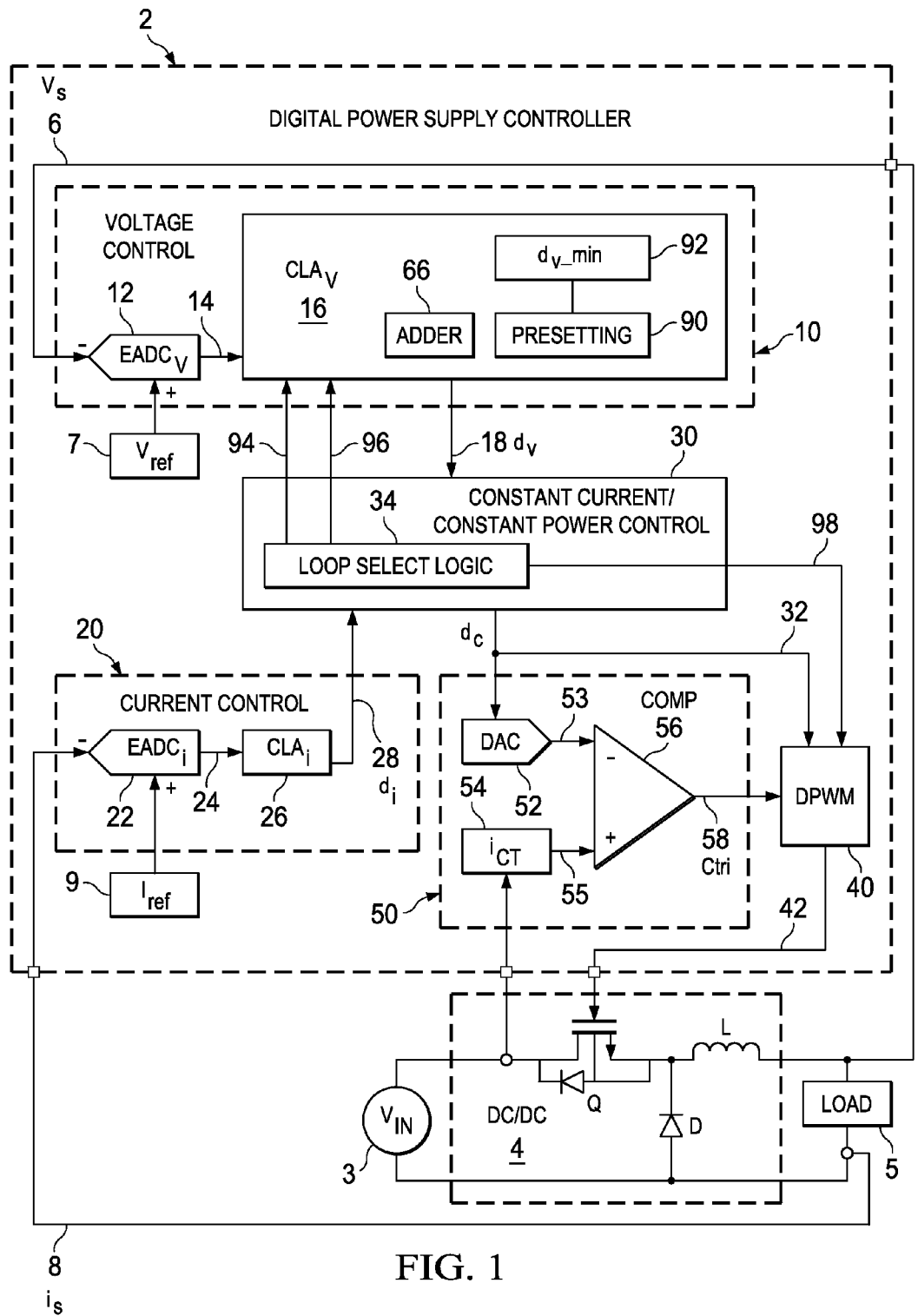
FIG. 1 is a schematic diagram illustrating an exemplary power supply controller having a constant current/constant power control circuit to pulse width modulator of a switching power supply according to a voltage loop duty cycle or a current loop duty cycle with logic to selectively preset the voltage loop duty cycle to a predetermined value prior to switching from current loop control to voltage loop control.

One or more embodiments or implementations are hereinafter described in conjunction with the drawings, wherein like reference numerals are used to refer to like elements throughout, and wherein the various features are not necessarily drawn to scale. The present disclosure provides apparatus and techniques for pulse width modulating a switching power supply, in which transitions from current loop operation to voltage loop operation are modified to selectively preset the output duty cycle of the voltage control loop and/or to inhibit increases in the value of the integrator of the voltage loop compensator circuit during current control loop operation, so as to mitigate or avoid undesirable output voltage spikes. The concepts of the present disclosure find particular utility in association with digital power supply controller integrated circuits, although analog and/or combination digital/analog controller embodiments are possible. In addition, the power supply controllers of the present disclosure may be employed to facilitate pulse width modulated operation of any form of switching power supply, including without limitation AC/DC converters, DC/DC converters, DC/AC converters or inverters, etc., which have one or more switching devices operated according to pulse width modulated control signals, wherein the various aspects of the present disclosure are not limited to the illustrated examples.

FIG. 1 illustrates a digital power supply controller apparatus 2 for providing one or more pulse width modulated switching control signals to a switching power supply 4. The power supply controller 2 includes a voltage controller or control circuit 10 forming part of a voltage control loop for constant voltage and constant power operation regulation of the output of the power supply 4, as well as a current control circuit 20 employed in constant current operation. FIG. 1 shows an example DC/DC buck converter type power supply 4 having a single semiconductor-based switching device Q forming an upper circuit branch in series with an inductor L, with a fly back diode D connected between a lower power supply circuit branch and the midpoint of the switch Q and the inductor L. The power supply 4 in this example receives input power from a DC voltage source 3 providing an input voltage $V_{IN}$, and operation of the switch Q provides DC output power to drive a load 5. The power supply controller 2 also includes a control circuit 30 providing a duty cycle output signal or value 32 ($d_c$) directly or indirectly to a digital pulse width modulation (DPWM) circuit 40 for providing one or more pulse width modulated switching control signals 42 to operate the switch Q of the power supply 4.

The voltage control circuit 10 provides a voltage control duty cycle signal or value 18 ($d_v$) to the control circuit 30, and the current control circuit 20 provides a current control duty cycle signal or value 28 ($d_i$) to the control circuit 30. The control circuit 30 operates in one of two modes for regulating the power supply 4 using the voltage control loop via the voltage control circuit 10 or using the current control loop via the current control circuit 20. In a first mode, the control circuit 30 provides the duty cycle output 32 as the voltage control duty cycle signal or value 18, and in the second mode, provides the current control duty cycle signal or value 28 as the output 32. In this particular embodiment, moreover, the power supply controller 2 includes a comparator circuit 50 for use in the second mode, with the duty cycle output 32 from the control circuit 30 being converted to analog form for comparison with a switching current of the power supply 4 to generate a comparator output signal 58 ($C_{tri}$) used as a duty cycle input to the DPWM circuit 40.

As seen in FIG. 1, the voltage control circuit 10 includes a voltage error circuit 12, in this case a voltage error analog to digital converter (EADC$_v$) receiving a feedback signal 6 ($V_S$) representing the output voltage of the power supply 4, as well as a voltage compensator circuit 16 (CLA$_v$). In operation, the voltage error circuit 12 compares a reference voltage signal or value 7 ($V_{ref}$) to the output voltage feedback 6, and provides a voltage error signal or value 14 based on the comparison. In one possible implementation, the reference voltage 7 may be a setpoint voltage value provided by an external system, or may be calculated or derived therefrom. In addition, the power supply controller 2 may selectively preset or change the voltage reference 7 to facilitate operation in constant power and/or constant current operational modes. For example, the reference voltage 7 may be a computed value representing the ratio of a maximum power rating (Pmax) divided by an output current value during constant power operation. Moreover, the voltage reference 7 can be an analog signal or a digital value in various implementations. Likewise, the output voltage 6 can be an analog signal or a digital value. In the illustrated embodiment, the voltage error circuit 12 includes an analog amplifier (not shown) providing a comparison error output representing the difference between the reference voltage 7 and the output voltage 62, along with an analog to digital converter (ADC, not shown) that converts the comparison error output to provide a digital voltage error value 14. Other embodiments are possible in which an analog amplifier or other suitable circuit is used to provide an analog voltage error signal 14 based at least partially on the power supply output voltage signal 6 and the reference signal 7.

The error 14, whether an analog signal or a digital value, is provided to a voltage compensator circuit 16 which then provides the voltage control duty cycle signal or value output 18 ($d_v$) to the control circuit 30. As with the error 14, the voltage control duty cycle output 18 may be an analog signal or a digital value that represents a duty cycle or on-time computed at least partially according to the error 14 for use in pulse width modulating the switching power supply 4. For instance, the voltage control duty cycle output 18 may be a digital value representing a percentage of time in a given PWM switching period for which the corresponding controlled power supply switch Q is to be turned on. In practice, any suitable form of compensator circuit 16 may be used, such as an analog or digital filter, which may in certain cases implement a proportional integral derivative (PID) control functionality, and the compensator circuit 16 may be a control law accelerator (CLA) as shown in the figures.

As described in greater detail below, moreover, the voltage compensator circuit 16 receives one or more control signals from the constant current/constant power control circuit 30 in certain embodiments. As seen in FIG. 1, the controller 30 provides a preset control signal 94 which causes a pre-setting circuit 90 of the compensator 16 to provide the duty cycle signal or value 18 as a predetermined duty cycle signal or value 92 ($d_{v\_min}$) prior to the control circuit 30 switching from the second mode to the first mode. In certain embodiments, moreover, the controller 30 provides a control signal 96 to selectively prevent increase of an integrator value maintained by an adder circuit 66 in the voltage compensator 16 while the control circuit 30 is in the second (current loop control) mode. An exemplary digital implementation of the voltage compensator circuit 16 is illustrated and described in greater detail below in connection with FIG. 3.

The current control circuit 20 also includes a current error circuit 22 (e.g., $EADC_i$) and a current compensator circuit 26 ($CLA_i$). As with the voltage control circuit 10, the current control circuit 20 can be used for processing analog signals or digital values or combinations thereof. In the illustrated embodiment, the current error circuit 22 provides a current error signal or value 24 at least partially according to a reference current 9 ($I_{ref}$) and an output current feedback signal or value 8 ($i_s$) which can be digital values and/or analog signals in various implementations. As shown, the current error circuit 22 is an error ADC circuit including an analog amplifier generating an analog error signal that is converted to a digital current error value 24 via an internal ADC (not shown). The current error value 24 is provided to the current compensator circuit 26, which provides the current control duty cycle signal or value 28 representing a duty cycle or an-time (e.g., a percentage) for pulse width modulation of the power supply switch Q based on the error 24. In the illustrated implementation, the current compensator 26 can be generally similar in construction to the voltage compensator 16, receiving a digital current error value 24 and outputting a digital current duty cycle value 28, with the voltage compensator 16 additionally providing presetting and/or integrator value freezing operation as described herein.

The control circuit 30 receives the voltage and current duty cycles 18 and 28, respectively, and selectively provides one of these as a duty cycle input signal or value 32 to the DPWM circuit 40 and also to the comparator circuit 50. The control circuit 30 in this regard can be any suitable digital and/or analog circuitry operative to selectively provide the duty cycle output according to one of the inputs 18 and 28. In particular, the control circuit 30 provides the duty cycle input 32 as the voltage control duty cycle 18 in a first mode, and provides the input 32 as the current control duty cycle 28 in a second mode. In addition, the control circuit 30 includes a logic circuit 34 which switches the control circuit 30 from the first mode to the second mode (i.e., from voltage loop mode to current loop mode) if the voltage control duty cycle 18 plus a predetermined non-zero hysteresis value A exceeds the current control duty cycle 28 (if $d_i < (d_v + \Delta)$), and switches the control circuit 30 from the second mode back to the first mode if the voltage control duty cycle 18 is less than the current control duty cycle 28 (if $d_v < d_i$). Any suitable non-zero hysteresis value $\Delta$ can be used, for example, around 2% in one implementation. Moreover, any suitable comparison circuit or logic can be used in the loop select logic circuit 34 to compare the duty cycle signals or values 18 and 28, and the logic circuit 34 can include any necessary switching circuitry or programmed logic, etc, in order to selectively provide the duty cycle 32 based on the mode as determined by comparison of the signals or values 18 and 28.

In addition, the logic circuit 34 in certain embodiments is operative to selectively preset the voltage control duty cycle signal or value 18 to the predetermined duty cycle signal or value 92 ($d_{v\_min}$) prior to switching the control circuit 30 from the second mode to the first mode. In certain embodiments, this is done by the logic circuit 34 providing a preset control signal 94 to a presetting circuit 90 of the voltage compensator 16 as described further below in connection with FIG. 3. Also, the exemplary logic circuit 34 provides a control signal 96 to the voltage compensator circuit 16 to selectively prevent or inhibit increase of an integrator value 66a stored in the adder circuit 66. Either or both of these techniques can be advantageously employed to reduce or avoid unwanted voltage spikes associated with switching from the current loop control operation to the voltage loop control operation.

Further, the loop select logic circuit 34 may provide a control signal 98 to the DPWM circuit 40 to indicate the duty cycle source to be used for pulse width modulation. In this regard, the illustrated DPWM circuit 40 selectively uses the duty cycle output 32 from the control circuit 30 in voltage mode control (a first mode) or uses the comparator output signal 58 from the comparator circuit 50 in the second (current loop control) mode. The comparator circuit 50 includes a digital to analog converter 52 (DAC) operative to convert the duty cycle input value 32 to an analog duty cycle input signal 53. A comparator 56 generates a comparator output signal 58 based on a comparison of the analog duty cycle input signal 53 with a feedback signal 55 representing a switching current of the power supply 4. The logic circuit 34 selectively provides the input select control signal 98 to cause the pulse width modulation circuit 40 to pulse width modulate the switch Q according to the duty cycle input signal or value 32 when the control circuit 30 is in the voltage mode control and to instead pulse width modulate the switch Q according to the comparator output signal 58 when the control circuit 30 is in the second mode. Which output signals are selected depends on the different power stage control modes employed.

Figure 2:
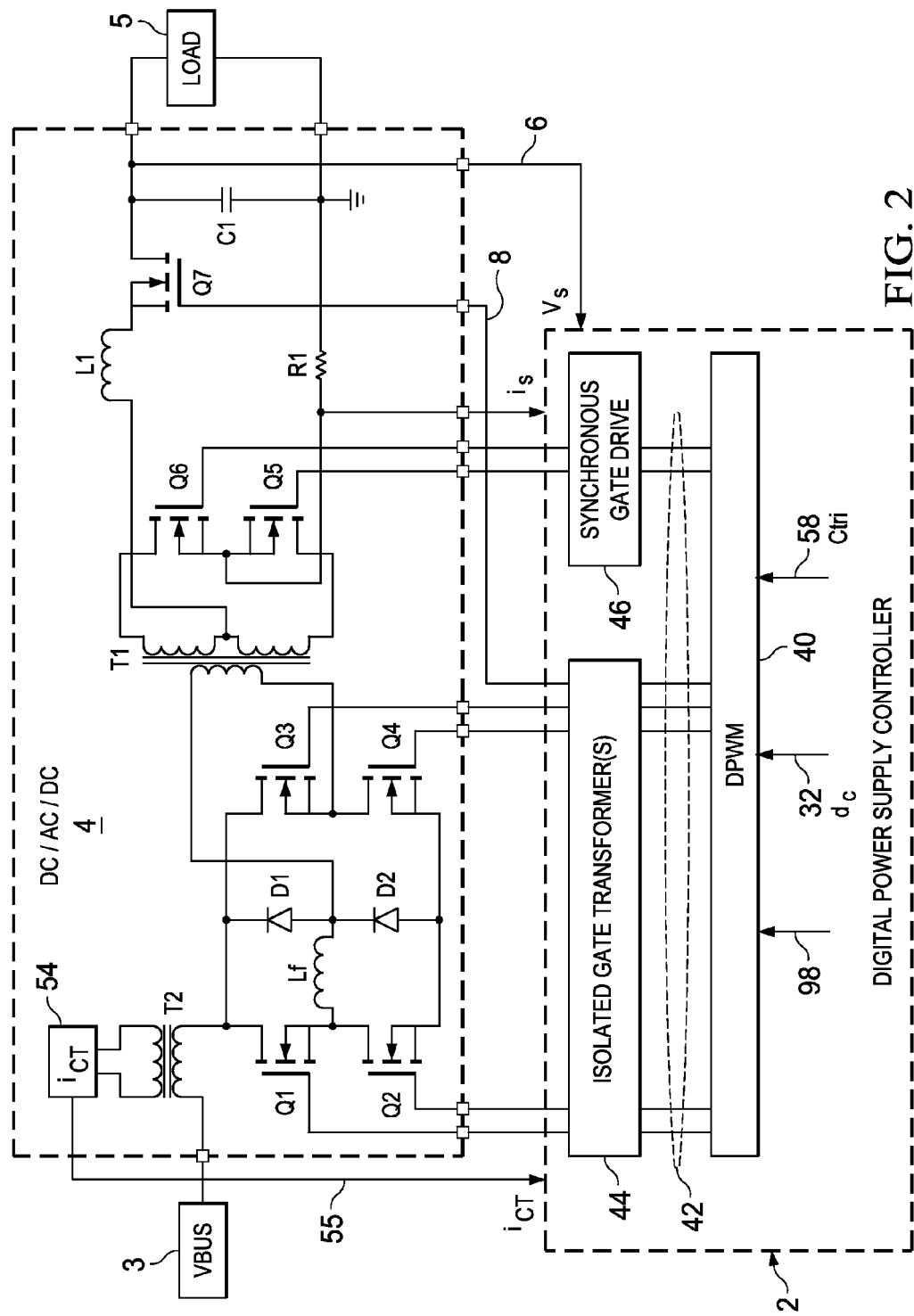
FIG. 2 is a schematic diagram illustrating further details of the power supply controller pulse width modulating multiple switches in a DC to AC to DC converter.

FIG. 2 illustrates another application of the power supply controller 2 providing pulse width modulation switching control signals with respect to multiple switches Q1-Q7 in a DC/AC/DC power supply 4. In this example, the power supply controller 2 includes a DPWM circuit 40 providing multiple pulse width modulated switching control signals 42, four of which are provided via isolated gate transformers 44 to inverter switches Q1-Q4 forming an H-bridge inverter circuit with diodes D1 and D2. In this example, an input transformer T2 includes a primary winding connected in series between a voltage source 3 (VBUS) and the input to the inverter formed by Q1-Q4. A secondary winding of the transformer T2 provides a current transformer signal source 54 ($i_{CT}$) generating a switching current sensor output 55 indicative of the current flowing through the transformer primary, and hence the current switched by the inverter circuit Q1-Q4. The output of the inverter is connected to the primary of an isolation transformer T1, having secondary windings connected to switches Q5 and Q6 whose gate signals are provided by the PWM switching signals 42 via a synchronous gate drive 46. The switching signals 42 are provided to the switches Q5 and Q6 to implement synchronous rectifiers providing DC voltage to output load 5 through an ORing MOSFET Q7 whose gate is driven by a switching control signal 42 from the DPWM circuit 40 via an isolated gate transformer 44 to regulate the output voltage across the capacitor C1 driving a load 5. The power supply controller 2 receives the voltage feedback signal 6 representing the output voltage, and a sense resistor R1 is used to provide the output current feedback signal 8. In operation in this embodiment, the DPWM circuit 40 provides the pulse width modulated switching control signals 42 according to one of the duty cycle output value 32 from the control circuit 30 or the comparator output signal 58 from the comparator circuit 50 according to the control signal 98 from the logic circuit 34 (FIG. 1).

Figure 3:
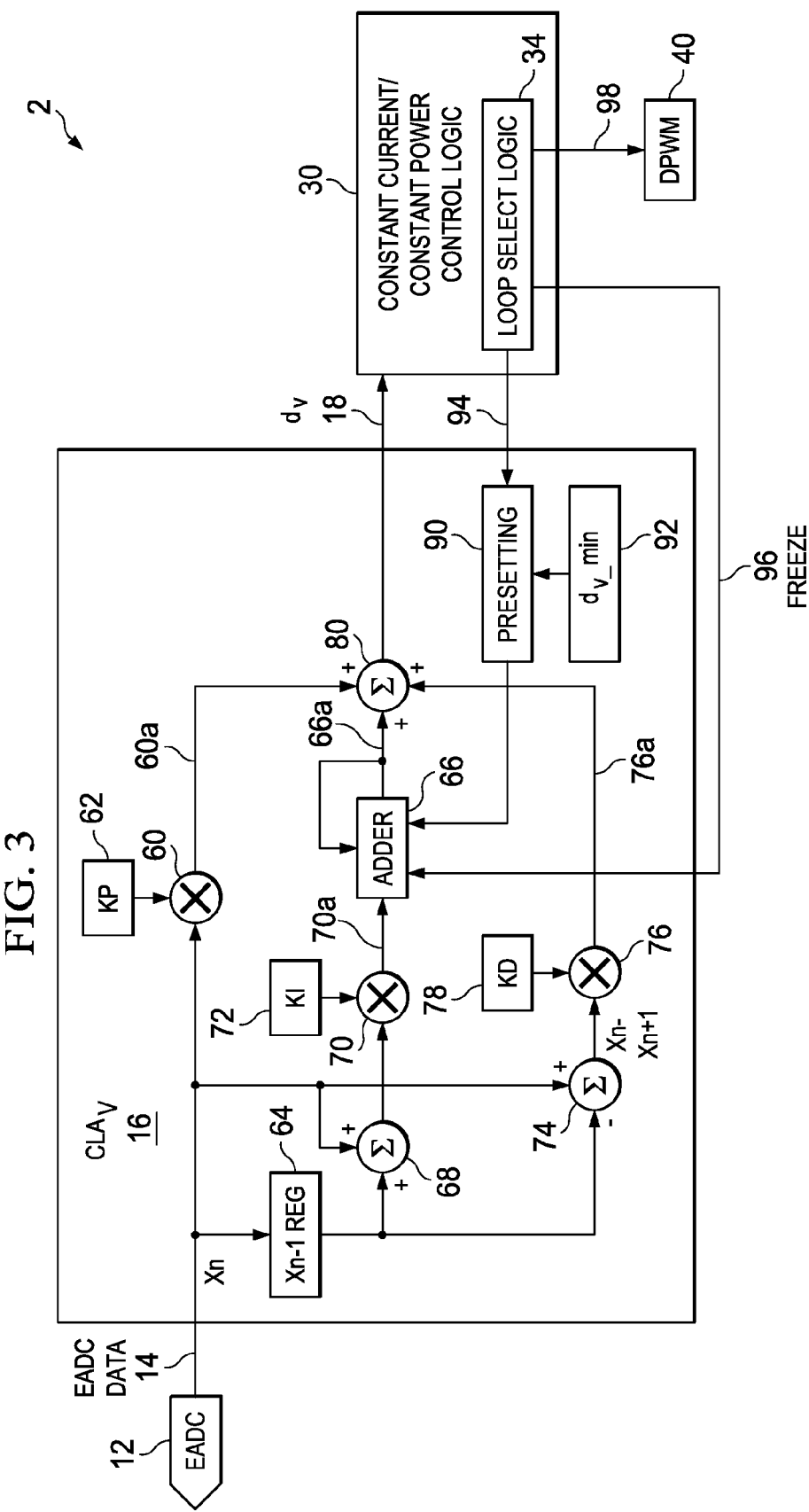
FIG. 3 is a schematic diagram illustrating further details of an exemplary digital voltage loop PID compensator circuit with a presetting circuit and an adder circuit configured to selectively freeze an integrator value according to a signal from the constant current/constant power control circuit.

FIG. 3 illustrates further details of an exemplary digital voltage loop PID compensator circuit 16 (control law accelerator or CLA) with a presetting circuit 90 operative according to the preset control signal 94 from the logic circuit 34 to selectively preset the output value 18 to be a predetermined value 92 ($d_v$_min) as described below. In addition, the embodiment of FIG. 3 includes an integrator value adder circuit 66 configured to selectively freeze an integrator value 66a according to a signal 96 (FREEZE) from the constant control circuit 30. The compensator circuit 16 implements a proportional-integral-derivative (PID) compensation architecture which may be implemented using digital filtering circuits and techniques as are known. Other embodiments are possible in which an analog compensator 16 can be used, which may provide PID compensation or other compensation filtering with respect to the error input 14 to generate a duty cycle output 18. In the illustrated digital embodiment, the compensator circuit 16 receives the digital voltage error value 14 (EADC DATA) as a series or parallel group of bits representing the error between the output voltage 6 and the voltage reference 7 as described above, which at any given time is a current sample Xn. A register 64 receives this and provides a delayed output representing the previous sample Xn−1.

The current voltage error sample is provided as an input to a multiplier 60 which creates a proportional compensation value 60a as the product of the current voltage error sample 14 and a proportional constant 62 (KP). The voltage compensator computes an integral compensation value 70a according to a summation of the current sample of the digital voltage error value 14 and the preceding sample from the register 64, via a summer 68 whose output value is (Xn+Xn−1), multiplied by an integral constant 72 (KI) using a multiplier 70. In the integral branch, the ADDER 66 sums the multiplication output 70a and the ADDER output 66a to form the integral compensation value 66a. The ADDER 66 can stop the integration when it is triggered or enabled by the FREEZE signal 96 from the loop select logic 34 and the previous stored data can be kept without change (frozen). The PID voltage compensator 16 further computes a derivative compensation value 76a according to a difference between the current sample of the digital voltage error value 14 and the preceding sample from the register 64 obtained by a summer 74 whose output (Xn−Xn−1) is multiplied by a derivative constant 78 (KD) using a multiplier 76 whose output provides the derivative compensation value 76a. The voltage compensator 16 then computes a digital voltage control duty cycle value 18 using a summer 80 as the sum of the proportional compensation value 60a, the integral compensation value 66a and the derivative compensation value 76a.

As seen in FIG. 3, the digital control value dv_min 92 is provided as an input to the presetting circuit 90. In certain embodiments, moreover, the predetermined duty cycle value 92 is set to be close to a current command value for the peak current mode control or the duty command for voltage mode control for the power supply 4 at light load. In operation, the logic circuit 34 provides the control signal 94 to preset the predetermined value 92 (FIG. 1), and in certain embodiments, the logic circuit 34 selectively refrains from presetting the predetermined value 92 if the voltage control duty cycle value 18 is actually less than the predetermined value 92 prior to switching the control circuit 30 from the second mode to the first mode.

In this manner, the selective presetting via the circuit 90 is done when needed to reduce the voltage loop control duty cycle 18 to a level that mitigates or avoids unwanted voltage spikes upon switching from current loop control back to voltage loop control, but may selectively refrain from this presetting if the duty cycle output of the voltage compensator as currently calculated would not lead to such voltage spikes. For example, the inventors have appreciated that if constant power is used, the presetting via circuit 90 and control signal 94 may not be needed since the computed $d_v$ may be smaller than $d_v$_min, whereby the output voltage may not indeed overshoot if the load current is removed from the Max load condition. On the other hand, however, if no constant power control is employed, the output might otherwise overshoot when the current is removed from the Max load condition, and thus the selective presetting via the logic circuit 34 provides a significant improvement over conventional voltage loop/current loop selection and switch over techniques.

Figure 4:
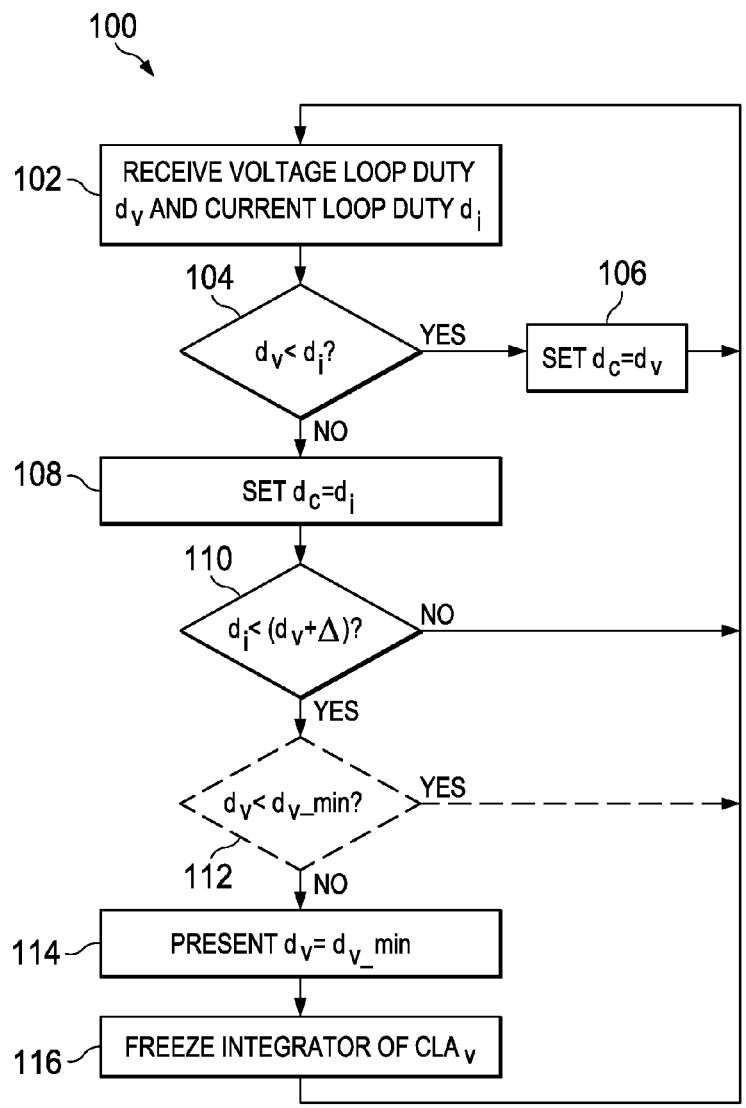
FIG. 4 is a flow diagram illustrating an exemplary method for pulse width modulating a switching power supply.

Referring also to FIG. 4, a method 100 is illustrated for providing pulse width modulation signals for pulse width modulating one or more power supply switches Q. In this regard, certain embodiments of the control circuit 30 and the logic 34 thereof may be operated generally according to the illustrated method 100. Although the exemplary method 100 is illustrated and described in the form of a series of acts or events, it will be appreciated that the various methods of the disclosure are not limited by the illustrated ordering of such acts or events except as specifically set forth herein. In this regard, except as specifically provided hereinafter, some acts or events may occur in different order and/or concurrently with other acts or events apart from those illustrated and described herein, and not all illustrated steps may be required to implement a process or method in accordance with the present disclosure. The illustrated methods may be implemented in hardware, processor-executed software, processor-executed firmware, FPGAs, logic circuitry, etc. or combinations thereof, in order to provide the power supply control functionality, with various selective loop switching, presetting, integrator freezing aspects described herein, although the present disclosure is not limited to the specifically illustrated or described applications and systems. In certain implementations, for example, the loop select logic 34, the provision of the presetting control signal 94, and the provision of the integrator value FREEZE control signal 96 may be done generally according to the following select logic:

```
if (d_v < d_i)
{
    d_c = d_v
}
else if (d_i < (d_v + Δ))
{
    d_c = d_i
    preset d_v = small duty
    freeze integrator of CLA_v
}
```

As seen in FIG. 4, the method 100 begins at 102 with receipt of the most recent samples of the voltage control loop duty cycle signal or value 18 and the current loop duty cycle signal or value 28, and a determination is made at 104 as to whether the voltage loop duty cycle is less than the current duty cycle. If so (YES at 104), the duty cycle input value 32 for pulse width modulation of the power supply switch or switches is set to the voltage loop duty cycle signal or value 18 at 106, and the process 100 returns for the next sample at 102 as described above. Otherwise (NO at 104), the duty cycle input 32 is set to the current loop duty cycle 28 at 108, and a determination is made at 110 as to whether the current loop duty cycle is less than the sum of the voltage loop duty cycle plus a small hysteresis value Δ. If not (NO at 110), the process returns to 102, and otherwise (YES at 110), an optional determination is made at 112 as to whether the voltage loop duty cycle 18 is less than the predetermined value 92. If this option is selected, and the result of the comparison is true (YES at 112) the process returns to 102 above. Otherwise (NO at 112), the voltage loop duty cycle value is preset at 114 to the predetermined value 92, and the voltage compensator integrator value is frozen at 116. Thereafter, the process 100 returns to again sample the voltage and current loop duty cycles 18, 28 at 102 as described above.

Figure 5:
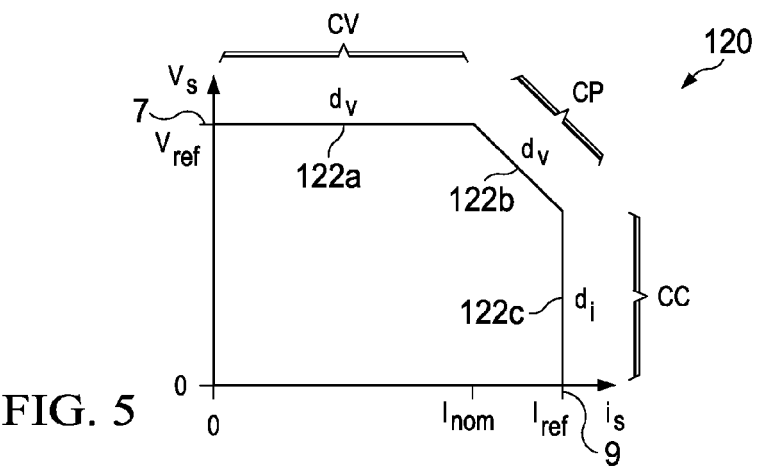
FIG. 5 is a graph illustrating constant voltage, constant power and constant current operation of the power supply controller.

FIG. 5 illustrates a graph showing exemplary output voltage vs. output current operation of the power supply controller 2. As seen in the graph 120, the curve 122 includes a first range 122a in which constant voltage (CV) control is achieved at the reference voltage level 7 ($V_{ref}$) using the voltage loop duty cycle signal or value $d_v$, as well as a second range 122b (also using the voltage loop duty cycle) for constant power control of the power supply 4. In addition, certain embodiments of the power supply controller 2 also provide constant current operation shown as the range 122c, which is initiated in certain embodiments when a demanded current equals a maximum rated current value 9 ($I_{ref}$). In this implementation, the constant power range 122b begins when the voltage reference calculated from the Pmax divided by the output current is smaller than a nominal reference setting, and continues until the reference current value $I_{ref}$ is reached, after which constant current control 122c is implemented via the loop switching logic circuit 34 to provide PWM control of the power supply switch or switches Q according to the current loop duty cycle signal or value 28 ($d_i$).

The above examples are merely illustrative of several possible embodiments of various aspects of the present disclosure, wherein equivalent alterations and/or modifications will occur to others skilled in the art upon reading and understanding this specification and the annexed drawings. In addition, although a particular feature of the disclosure may have been disclosed with respect to only one of multiple implementations, such feature may be combined with one or more other features of other embodiments as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

What is claimed is:

1. A power supply controller for controlling a switching power supply, comprising:
    a voltage control circuit, including:
        a voltage error circuit providing a voltage error signal or value based at least partially on a reference voltage signal or value and an output voltage of the switching power supply, and
        a voltage compensator circuit providing a voltage control duty cycle signal or value based at least partially on the voltage error signal or value;
    a current control circuit, including:
        a current error circuit providing a current error signal or value based at least partially on a reference current signal or value and an output current of the switching power supply, and
        a current compensator circuit providing a current control duty cycle signal or value based at least partially on the current error signal or value;
    a pulse width modulation circuit operative to pulse width modulate at least one switch of the switching power supply at least partially according to a duty cycle input signal or value; and
    a control circuit selectively operative in a first mode to provide the voltage control duty cycle signal or value as the duty cycle input signal or value, and in a second mode to provide the current control duty cycle signal or value as the duty cycle input signal or value, the control circuit comprising a logic circuit operative to:
        switch the control circuit from the first mode to the second mode if a sum of the voltage control duty cycle signal or value plus a predetermined non-zero hysteresis value is greater than the current control duty cycle signal or value, and
        selectively preset the voltage control duty cycle signal or value to a predetermined duty cycle signal or value and then switch the control circuit from the second mode to the first mode if the voltage control duty cycle signal or value is less than the current control duty cycle signal or value.

2. The power supply controller of claim 1, wherein the logic circuit is operative to prevent increase of an integrator signal or value of the voltage compensator circuit while the control circuit is in the second mode.

3. The power supply controller of claim 1, wherein the voltage compensator circuit comprises:
    a proportional integral derivative (PID) circuit operative to:
        generate a proportional compensation signal or value based on the voltage error signal or value and a proportional constant,
        generate an integral compensation signal or value based on an integral of the voltage error signal or value and an integral constant,
        generate a derivative compensation signal or value based on a rate of change of the voltage error signal or value and a derivative constant, and
        to generate a PID output signal or value as a sum of the proportional compensation signal or value, the integral compensation signal or value, and the derivative compensation signal or value; and
    a presetting circuit operative to provide the voltage control duty cycle signal or value as either the PID output signal or value or as the predetermined duty cycle signal or value based on a preset control signal;
    wherein the logic circuit is operative to selectively preset the voltage control duty cycle signal or value to the predetermined duty cycle value by providing the preset control signal to the presetting circuit if the current control duty cycle signal or value is less than the voltage control duty cycle signal or value.

4. The power supply controller of claim 1, wherein the logic circuit is operative to selectively refrain from presetting the voltage control duty cycle signal or value to the predetermined duty cycle signal or value if the voltage control duty cycle signal or value is less than the predetermined duty cycle value prior to switching the control circuit from the second mode to the first mode.

5. The power supply controller of claim 1:

wherein the voltage error circuit is operative to provide a digital voltage error value representing a difference between the reference voltage signal or value and the output voltage of the switching power supply;

wherein the voltage compensator circuit comprises an adder circuit to provide an integrator value based at least partially on prior samples of the digital voltage error value, wherein the voltage compensator circuit computes an integral compensation value based at least partially on the integrator value and wherein the voltage compensator circuit provides the voltage control duty cycle signal or value based at least partially on the integral compensation value; and wherein the logic circuit provides a control signal to the voltage compensator circuit to selectively prevent increase of the integrator value while the control circuit is in the second mode, and selectively provides a preset control signal to cause the voltage compensator circuit to provide the voltage control duty cycle signal or value as the predetermined duty cycle signal or value prior to switching the control circuit from the second mode to the first mode.

6. The power supply controller of claim 1, comprising:

a comparator circuit including:

a digital to analog converter operative to convert the duty cycle input signal or value to an analog duty cycle input signal, and a comparator generating a comparator output signal based on a comparison of the analog duty cycle input signal with a feedback current signal representing a switching current of the switching power supply;

wherein the logic circuit is operative to selectively provide an input select control signal to the pulse width modulation circuit to cause the pulse width modulation circuit to pulse width modulate the at least one switch according to the duty cycle input signal or value when the control circuit is in the first mode, and to pulse width modulate the at least one switch according to the comparator output signal when the control circuit is in the second mode.

7. The power supply controller of claim 1, wherein the predetermined duty cycle value is close to a current command value for peak current mode control at light load or to a duty cycle command value for voltage mode control at light load.

8. The power supply controller of claim 2:

wherein the voltage error circuit is operative to provide a digital voltage error value representing a difference between the reference voltage signal or value and the output voltage of the switching power supply;

wherein the voltage compensator circuit comprises a digital adder circuit to provide the integrator signal or value based at least partially on a current integral value and previous error samples; and wherein the logic circuit provides a control signal to the voltage compensator circuit to selectively prevent increase of the integrator value of the adder circuit while the control circuit is in the second mode.

9. The power supply controller of claim 8, wherein the voltage compensator circuit comprises:

a digital proportional integral derivative (PID) circuit operative to:

compute a proportional compensation value based on the digital voltage error value and a proportional constant, compute an integral compensation value based on a current sample of the digital voltage error value, the integrator value, and an integral constant, compute a derivative compensation value based on a difference between a current sample of the digital voltage error value and a preceding sample of the digital voltage error value, and a derivative constant, and to compute a digital voltage control duty cycle value as a sum of the proportional compensation value, the integral compensation value, and the derivative compensation value; and a presetting circuit operative to provide the voltage control duty cycle signal or value as either the digital voltage control duty cycle value or as the predetermined duty cycle signal or value based on a preset control signal;

wherein the logic circuit is operative to selectively preset the voltage control duty cycle signal or value to the predetermined duty cycle signal or value by providing the preset control signal to the presetting circuit if the current control duty cycle signal or value is less than the voltage control duty cycle signal or value.

10. The power supply controller of claim 9, wherein the logic circuit is operative to selectively refrain from presetting the voltage control duty cycle signal or value to the predetermined duty cycle signal or value if the voltage control duty cycle signal or value is less than the predetermined duty cycle signal or value prior to switching the control circuit from the second mode to the first mode.

11. A switching power supply, comprising:

an input configured to receive input power from a connected source;

an output operative to provide output power to a connected load;

at least one switch operative according to a switching control signal to selectively convert the input power from the input to provide the output power to the output; and a power supply controller operative to provide the switching control signal to the at least one switch, the power supply controller comprising:

a voltage control circuit, including:

a voltage error circuit providing a voltage error signal or value representing a difference between a reference voltage signal or value and an output voltage of the switching power supply, and a voltage compensator circuit with a digital adder circuit providing an integrator signal or value based at least partially on a current error value and previous error samples, the voltage compensator circuit providing a voltage control duty cycle signal or value based at least partially on the voltage error signal or value and on the integrator signal or value, the voltage compensator circuit comprising a digital proportional integral derivative (PID) circuit operative to compute a proportional compensation value based on the digital voltage error value and a proportional constant, to compute an integral compensation value based on a current sample of the digital voltage error value, the integrator value, and an integral constant, to compute a derivative compensation value based on a difference between a current sample of the digital voltage error value and a preceding sample of the digital voltage error value, and a derivative constant, and to compute a digital voltage control duty cycle value as a sum of the proportional compensation value, the integral compensation value, and the derivative compensation value, and a presetting circuit operative to provide the voltage control duty cycle signal or value as either the digital voltage control duty cycle value or as the predetermined duty cycle signal or value based on a preset control signal, a current control circuit, including:

a current error circuit providing a current error signal or value based at least partially on a reference current signal or value and an output current of the switching power supply, and a current compensator circuit providing a current control duty cycle signal or value based at least partially on the current error signal or value, a pulse width modulation circuit operative to pulse width modulate at least one switch of the switching power supply at least partially according to a duty cycle input signal or value, and a control circuit selectively operative in a first mode to provide the voltage control duty cycle signal or value as the duty cycle input signal or value, and in a second mode to provide the current control duty cycle signal or value as the duty cycle input signal or value, the control circuit comprising a logic circuit operative to switch the control circuit from the first mode to the second mode if a sum of the voltage control duty cycle signal or value plus a predetermined non-zero hysteresis value is greater than the current control duty cycle signal or value, to selectively preset the voltage control duty cycle signal or value to a predetermined duty cycle signal or value by providing the preset control signal to the presetting circuit if the current control duty cycle signal or value is less than the voltage control duty cycle signal or value and then switch the control circuit from the second mode to the first mode if the voltage control duty cycle signal or value is less than the current control duty cycle signal or value, and to selectively prevent increase of the integrator signal or value of the voltage compensator circuit while the control circuit is in the second mode.

12. A power supply controller for controlling a switching power supply, comprising:

a voltage control circuit operative to determine a voltage error signal or value based on a difference between a reference voltage signal or value and an output voltage of the switching power supply, and to determine an integrator value based at least partially on prior samples of the voltage error signal or value, the voltage control circuit providing a voltage control duty cycle signal or value based at least partially on the voltage error signal or value and the integrator value;

a current control circuit providing a current control duty cycle signal or value based at least partially on a reference current signal or value and an output current of the switching power supply;

a pulse width modulation circuit operative to pulse width modulate at least one switch of the switching power supply at least partially according to a duty cycle input signal or value; and a control circuit selectively operative in a first mode to provide the voltage control duty cycle signal or value as the duty cycle input signal or value, and in a second mode to provide the current control duty cycle signal or value as the duty cycle input signal or value, the control circuit comprising a logic circuit operative to:

switch the control circuit from the first mode to the second mode for constant current control of the switching power supply if a sum of the voltage control duty cycle signal or value plus a predetermined non-zero hysteresis value is greater than the current control duty cycle signal or value, selectively prevent increase of the integrator value while the control circuit is in the second mode, and switch the control circuit from the second mode to the first mode for constant power or constant voltage control of the switching power supply if the voltage control duty cycle signal or value is less than the current control duty cycle signal or value.

13. The power supply controller of claim 12, wherein the control circuit is operative, if the voltage control duty cycle signal or value is greater than a predetermined duty cycle value, to selectively preset the voltage control duty cycle signal or value to the predetermined duty cycle signal or value before switching the control circuit from the second mode to the first mode.

14. The power supply controller of claim 12, comprising:

a comparator circuit including:

a digital to analog converter operative to convert the duty cycle input signal or value to an analog duty cycle input signal, and a comparator generating a comparator output signal based on a comparison of the analog duty cycle input signal with a feedback current signal representing a switching current of the switching power supply;

wherein the logic circuit is operative to selectively provide an input select control signal to the pulse width modulation circuit to cause the pulse width modulation circuit to pulse width modulate the at least one switch according to the duty cycle input signal or value when the control circuit is in the first mode, and to pulse width modulate the at least one switch according to the comparator output signal when the control circuit is in the second mode.

15. The power supply controller of claim 13, wherein the predetermined duty cycle value is close to a current command value for peak current mode control at light load or to a duty cycle command value for voltage mode control at light load.

16. The power supply controller of claim 13:

wherein the voltage control circuit comprises:

a voltage error circuit operative to provide a digital voltage error value representing a difference between the reference voltage signal or value and the output voltage of the switching power supply;

a voltage compensator circuit with an adder circuit operative to provide the integrator value based at least partially on prior samples of the digital voltage error value; and wherein the logic circuit provides a control signal to the voltage compensator circuit to selectively prevent increase of the integrator value while the control circuit is in the second mode, and selectively provides a preset control signal to cause the voltage compensator circuit to provide the voltage control duty cycle signal or value as the predetermined duty cycle signal or value prior to switching the control circuit from the second mode to the first mode.

17. A method of providing pulse width modulation signals for pulse width modulation of at least one switch of a switching power supply, the method comprising:
- comparing a voltage loop duty cycle to a current loop duty cycle;
- pulse width modulating the at least one switch according to the current loop duty cycle if a sum of the voltage loop duty cycle plus a predetermined non-zero hysteresis value is greater than the current loop duty cycle; and
- if the voltage loop duty cycle is less than the current loop duty cycle, selectively presetting the voltage loop duty cycle to a predetermined duty cycle, and then pulse width modulating the at least one switch according to the voltage loop duty cycle.

18. The method of claim 17, comprising preventing increase of an integrator value used in computing the voltage loop duty cycle while pulse width modulating the at least one switch according to the current loop duty cycle.

19. The method of claim 17, comprising selectively refraining from presetting the voltage loop duty cycle to the predetermined duty cycle if the voltage control duty cycle is less than the predetermined duty cycle.

20. The method of claim 18, comprising selectively refraining from presetting the voltage loop duty cycle to the predetermined duty cycle if the voltage control duty cycle is less than the predetermined duty cycle.

\* \* \* \* \*